J. R. BLAKE.
SHOCK ABSORBER.
APPLICATION FILED OCT. 24, 1919.

1,328,812.

Patented Jan. 27, 1920.

INVENTOR
John R. Blake.
BY
Fred G. Dieterich
ATTORNEYS

# UNITED STATES PATENT OFFICE.

JOHN R. BLAKE, OF ROLLING PRAIRIE, INDIANA.

SHOCK-ABSORBER.

1,328,812.　　　　　Specification of Letters Patent.　　Patented Jan. 27, 1920.

Application filed October 24, 1919. Serial No. 332,876.

*To all whom it may concern:*

Be it known that I, JOHN R. BLAKE, a citizen of the United States, residing at Rolling Prairie, in the county of Laporte and State of Indiana, have invented a new and Improved Shock-Absorber, of which the following is a specification.

This invention has reference to improvements in spring suspension or shock absorbing means, that is more especially designed for use on motor vehicles, and which particularly relates to that type of spring suspension means in which is included auxiliary suspension springs coöperatively combined with the main semi-elliptical springs that connect with the axles and constitute means for resiliently supporting the vehicle body upon the under frame or wheel axles.

Primarily, my invention has for its object to provide a spring suspension of the general character referred to, of a simple, economical and stable construction, and in which but a single auxiliary spring connection is so mounted and combined with the main suspension spring that the natural quick actions of the main and the auxiliary spring will so interfere or oppose that a resultant slower action, especially on the rebound, is produced.

Another object of my invention is to provide an arrangement of spring suspension that is particularly well adapted for making "Ford" cars ride smoothly with any load and over any road.

Again, my invention embodies in a spring suspension of the kind mentioned, certain peculiar connections between the main and the auxiliary springs that tend to provide for easy riding under normal vibrations, as when traveling along smooth roads, and which are quickly stiffened up upon severe rebounds and adapted for taking up and reducing the shocks or rebounds incident to travel over rough roads.

With the above objects and other objects hereinafter apparent, in view, my invention consists in the peculiar and novel arrangement of parts hereinafter described in detail, specifically pointed out in the appended claims and illustrated in the accompanying drawings, in which:

Figure 1:
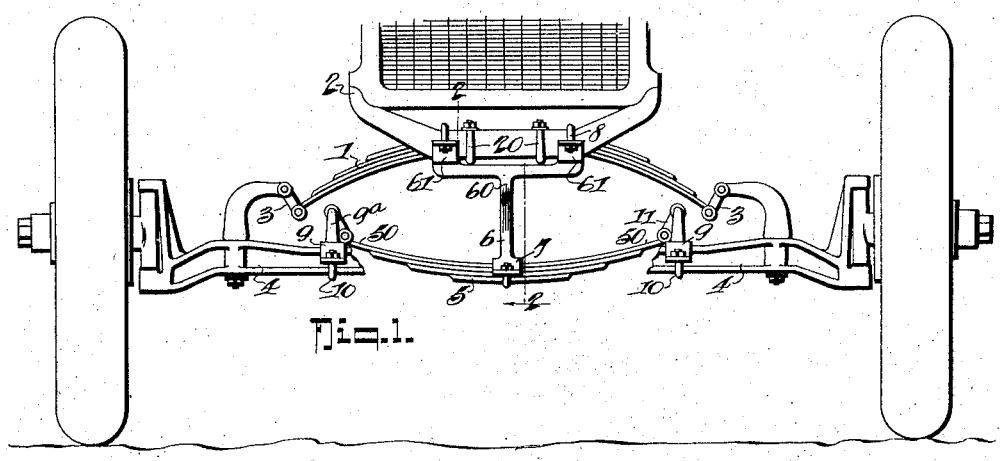
Figure 1 illustrates, in elevation, my construction of spring suspension as applied to a front axle.
Figure 2:
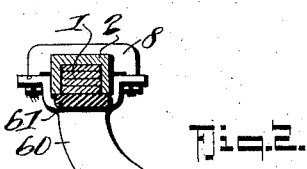
Fig. 2 is a cross section thereof on the line 2—2 on Fig. 1.

In the practical arrangement of my invention, the main semi-elliptical transverse spring 1 is rigidly attached, at the center of its arched portion to the body 2, by clip connections 20—20 and the opposite ends of the said spring 1 are joined, by shackles 3—3 to the axle 4, near the outer ends thereof, as is clearly shown in Fig. 1.

5 designates an auxiliary semi-elliptical spring, the peculiar positioning of which, its connection with the axle 4 and its connection with the main spring 1, constitutes the essential feature of my invention.

Figure 3:
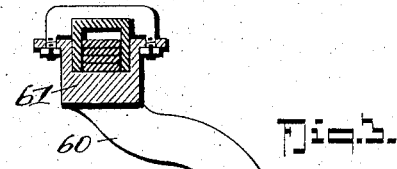
Fig. 3 is a similar view on the line 3—3 on Fig. 6.

The auxiliary spring 5 for the front axle, referred to, is located back of and adjacent to the said front axle and it is connected to the main spring 1 by a rigid frame or center post 6 fixedly connected to the center of the downwardly arched spring 5, by clip connections 7, as is best shown in Fig. 3, by reference to which it will also be observed that the upper end of the post 6 terminates in an inwardly extended angled portion 60 which includes bifurcations or saddle members 61 that straddle the body clips 2—2, which secure the upwardly arched main spring to the vehicle body and which are fixedly connected to the said main spring and the body by clip connections 8—8, as shown.

Figures 4, 5:
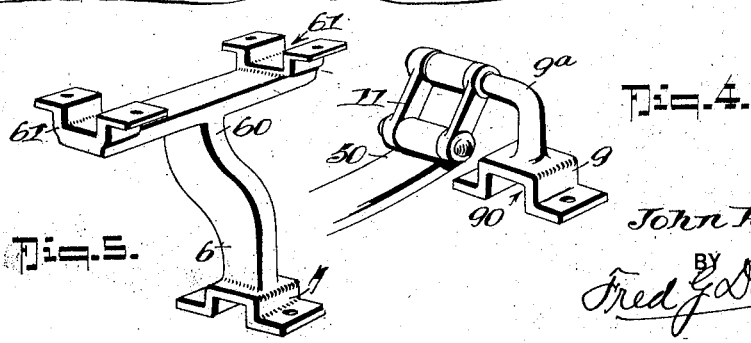
Fig. 4 is a detail perspective view of one of the hanger connections that join the ends of the auxiliary springs to the axle.
Fig. 5 is a perspective view of the center post or frame that connects the central portion of the oppositely arched main and auxiliary springs.

9—9 indicate brackets that include saddle portions 90 for engaging the axle to which they are secured by clips 10, see Fig. 4.

The brackets 9 mentioned extend inwardly with their ends 9ᵃ in transverse alinement with the ends 50 of the auxiliary spring 5 and are connected with the said spring ends 50 by shackles 11—11.

By reason of connecting the auxiliary spring with the main spring and arched in a direction opposite to that of the main spring, or in other words, bent downwardly reversely to the curvature of the upper main spring 1, the said auxiliary spring offers but little resistance to the downward movement of the central frame or post 6 and the main spring, as the latter distends under ordinary vibrations or shocks, but quickly and considerably stiffens up and checks the rebound or upward movement which is so hard on cars and tires, it being understood the increase in stiffness becomes more and more effective under the severe deflections of the main spring, due to bad road surface, the connections between the two springs, in my arrangement, being such that while under ordinary conditions, the spring suspension provides for easy riding, under abnormal conditions, such as are made on rough roads, the suspension is materially stiffened and sufficient to keep the body from bumping the axles.

Figure 6:
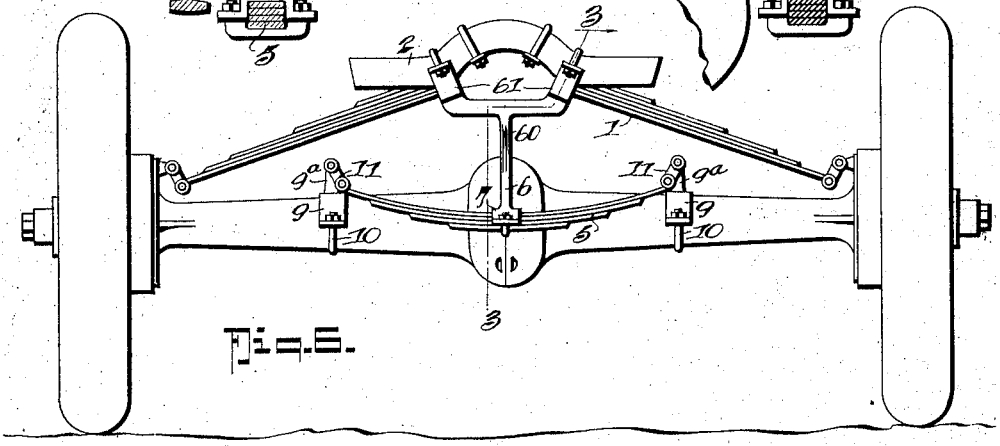
Fig. 6 shows, in elevation, my invention as operatively connected with the rear end frame or axle.

The spring suspension for the rear axle, see Fig. 6, in practice, is identical in structure to that for the front axle with the auxiliary spring placed far enough back of the rear axle to clear the differential housing.

From the foregoing description taken in connection with the drawings, it is believed that the complete construction, the manner of its operation and the advantages of my invention will be readily apparent to those familiar with mechanisms of the kind to which my said invention relates.

What I claim is:

1. In a shock absorber in combination with the vehicle body and an axle, a transverse semi-elliptical main spring pivotally secured at the opposite ends to the axle, the said spring being bent upwardly from the axle, means rigidly attaching the arched portion of the said main spring to the vehicle body and a supplemental semi-elliptical spring bent downwardly from the axle, means attached to and projected from the axle to which the ends of the auxiliary spring are pivotally connected and a rigid connection that fixedly joins at one end with the arched portion of the main spring and at the other end with the arched portion of the auxiliary spring.

2. In a shock absorber of the character stated, the combination with the axle, the body and the main upwardly arched suspension spring pivotally connected at its ends to the axle and to whose arched portion the vehicle body is fixedly secured; of an auxiliary spring, means for sustaining the said auxiliary spring with its arched portion extended downwardly relatively to the axle and in advance of the said axle, the said means including shackle connections that connect with the opposite ends of the auxiliary spring, and a rigid connection that joins the centers of the upwardly and downwardly arched portions of the main and auxiliary springs, respectively.

3. In a shock absorber of the character stated, the combination with the axle, the body and the main upwardly arched suspension spring pivotally connected at its ends to the axle and to whose arched portion the vehicle body is fixedly secured; of an auxiliary spring, means for sustaining the said auxiliary spring with its arched portion extended downwardly relatively to the axle and in advance of the said axle, the said means including shackle connections that connect with the opposite ends of the auxiliary spring, and a rigid connection that joins the centers of the upwardly and downwardly arched portions of the main and auxiliary springs, respectively, the said means comprising a post, devices for rigidly connecting the upper end of the said post to the main spring, the said post including an upwardly extended angled portion and a vertical portion in vertical alinement with the auxiliary spring and with its lower end clipped onto the auxiliary spring.

4. A shock absorber for motor vehicles, comprising in combination with the main axle, the body frame and the main semi-elliptical spring that curves upwardly from the axle and whose opposite ends have shackle connections with the axle, an auxiliary semi-elliptical spring that curves downwardly with respect to the axle, means for sustaining the auxiliary spring in advance of and in parallelism with the axle, said means including a shackle connection for each end of the auxiliary spring and a rigid post, and means for fixedly connecting the upper end of the post to the body frame and the main spring and other means that connect the lower end of the said post to the auxiliary spring.

JOHN R. BLAKE.